United States Patent
Weitze et al.

(10) Patent No.: US 11,396,283 B2
(45) Date of Patent: Jul. 26, 2022

(54) VEHICLE BRAKING SYSTEM

(71) Applicant: Robert Bosch GmbH, Stuttgart (DE)

(72) Inventors: Thomas Weitze, Mount Pleasant, SC (US); Bernhard Jahnke, Stuttgart (DE); Christoph Eisele, Heilbronn (DE); Michael Kloss, Ilsfled-Auenstein (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 16/605,412

(22) PCT Filed: Apr. 5, 2018

(86) PCT No.: PCT/EP2018/058779
§ 371 (c)(1),
(2) Date: Oct. 15, 2019

(87) PCT Pub. No.: WO2018/192779
PCT Pub. Date: Oct. 25, 2018

(65) Prior Publication Data
US 2020/0055504 A1 Feb. 20, 2020

Related U.S. Application Data

(60) Provisional application No. 62/488,430, filed on Apr. 21, 2017, provisional application No. 62/514,281, (Continued)

(51) Int. Cl.
*B60T 8/48* (2006.01)
*B60T 8/40* (2006.01)

(52) U.S. Cl.
CPC .......... *B60T 8/4845* (2013.01); *B60T 8/4031* (2013.01); *B60T 2270/14* (2013.01)

(58) Field of Classification Search
CPC ... B60T 8/4845; B60T 8/4031; B60T 2270/14
See application file for complete search history.

(56) References Cited

U.S. PATENT DOCUMENTS 6,533,369 B2  3/2003  Baumgertner et al.
6,820,946 B2  11/2004  Salamat et al.
(Continued)

FOREIGN PATENT DOCUMENTS

CN    104080669 A    10/2014
DE  102012205860 A1  10/2012
(Continued)

OTHER PUBLICATIONS

International Search Report and Written Opinion for Application No. PCT/EP2018/058779 dated Aug. 2, 2018 (11 pages).
(Continued)

*Primary Examiner* — Melanie Torres Williams
(74) *Attorney, Agent, or Firm* — Michael Best & Friedrich LLP (57) ABSTRACT

A vehicle braking system includes a master cylinder, and a wheel cylinder. A primary braking unit includes a first pressure generating unit distinct from the master cylinder and is operable to actuate a braking action at the wheel cylinder in a primary mode of operation. The primary braking unit further includes an outlet port connecting the primary braking unit to the wheel cylinder. A secondary braking unit includes a second pressure generating unit distinct from the master cylinder and operable to actuate a braking action at the wheel cylinder in a secondary mode of operation. The secondary braking unit an inlet port connected to the outlet port of the primary braking unit. The primary braking unit includes one or more ABS valves operable to control traction control and anti-lock braking in the primary mode of operation and located between the first pressure generating unit and the outlet port of the primary
(Continued)

braking unit. The secondary braking unit is located between the one or more ABS valves and the wheel cylinder.

18 Claims, 8 Drawing Sheets

Related U.S. Application Data filed on Jun. 2, 2017, provisional application No. 62/558,672, filed on Sep. 14, 2017.

(56) References Cited

U.S. PATENT DOCUMENTS

| | | | |
|---|---|---|---|
| 7,213,892 B2 | 5/2007 | Kato et al. | |
| 7,559,613 B2 | 7/2009 | Kokubo | |
| 9,358,964 B2 | 6/2016 | Ito et al. | |
| 9,555,788 B2 | 1/2017 | Brok et al. | |
| 9,561,787 B2 | 2/2017 | Quirant et al. | |
| 2008/0295506 A1 | 12/2008 | Saito et al. | |
| 2011/0241419 A1 | 10/2011 | Ohkubo et al. | |
| 2015/0175146 A1* | 6/2015 | Quirant | B60T 8/4081 303/14 |
| 2016/0113155 A1 | 4/2016 | Koga et al. | |
| 2016/0311413 A1 | 10/2016 | Odate | |
| 2016/0311414 A1 | 10/2016 | Odate | |
| 2017/0072920 A1 | 3/2017 | Besier et al. | |

FOREIGN PATENT DOCUMENTS

| | | |
|---|---|---|
| DE | 102015114195 A1 | 3/2016 |
| DE | 102014225954 A1 | 6/2016 |
| DE | 102014225958 A1 | 6/2016 |
| DE | 102016203111 A1 | 9/2016 |
| JP | 2005153781 A | 6/2005 |
| JP | 2006103548 A | 4/2006 |

OTHER PUBLICATIONS

Chinese Patent Office Search Report for Application No. 201880026097.X dated Apr. 28, 2021 (4 pages including statement of relevance).

Translation of Japanese Patent Office Notice of Reasons for Refusal for Application No. 2019-556944 dated Jan. 4, 2021 (16 pages).

* cited by examiner

VEHICLE BRAKING SYSTEM

BACKGROUND

The present disclosure relates to vehicle braking systems. In particular, the invention relates to a vehicle braking system including a primary braking unit and a secondary braking unit.

SUMMARY

In one aspect, a vehicle braking system includes a master cylinder, and a wheel cylinder. A primary braking unit includes a first pressure generating unit distinct from the master cylinder and is operable to actuate a braking action at the wheel cylinder in a primary mode of operation. The primary braking unit further includes an outlet port connecting the primary braking unit to the wheel cylinder. A secondary braking unit includes a second pressure generating unit distinct from the master cylinder and operable to actuate a braking action at the wheel cylinder in a secondary mode of operation. The secondary braking unit has an inlet port connected to the outlet port of the primary braking unit. The primary braking unit includes one or more ABS valves operable to control traction control and anti-lock braking in the primary mode of operation and located between the first pressure generating unit and the outlet port of the primary braking unit. The secondary braking unit is located between the one or more ABS valves and the wheel cylinder.

Further, in some embodiments, the secondary braking unit includes one or more ABS valves operable to control traction control and anti-lock braking in the secondary mode of operation, and located between the second pressure generating unit and the wheel cylinder.

Further, in some embodiments, the vehicle braking system includes an input device. The first pressure generating unit is operable in response to a user input to the input device in the first mode of operation, and wherein the second pressure generating unit is operable independent of the user input device in the second mode of operation.

Further, in some embodiments, the wheel cylinder is one of a plurality of wheel cylinders, and the port is one of a plurality of ports connecting the primary braking unit to the plurality of wheel cylinders. The secondary braking unit interfaces with the primary braking unit only at the plurality of ports.

Further, in some embodiments, the first pressure generating unit is a motor-driven plunger, and wherein the second pressure generating unit is one of a motor-driven pump or an accumulator.

Further, in some embodiments, the primary braking unit includes a first valve block and the secondary braking unit includes a second valve block mounted to the first valve block.

Further, in some embodiments, the secondary braking unit further includes an inlet port at the outlet port of the primary braking unit and a separation valve positioned between the inlet port and the wheel cylinder. The separation valve is in an open position in the primary mode of operation and is in a closed position in the secondary mode of operation.

In another aspect, a vehicle braking system includes a primary braking unit having a master cylinder operable to selectively provide pressurized fluid to an outlet port of the primary braking unit and a first pressure generating unit operable to selectively provide pressurized fluid to the outlet port of the primary braking unit. The vehicle braking system further includes a secondary braking unit having an inlet port connected to the outlet port of the primary braking unit and a second pressure generating unit operable to selectively provide pressurized fluid to an outlet port of the secondary braking unit. The primary braking unit and the secondary braking unit form a combined braking system having an outlet connecting the combined braking system to a wheel cylinder. The outlet of the combined braking system is provided in the secondary braking unit.

Further, in some embodiments, the secondary braking unit is operable without use of the primary braking unit.

Further, in some embodiments, the primary braking unit includes a first reservoir and the secondary braking unit includes a second reservoir.

Further, in some embodiments, the secondary pressure source is one of a motor-driven pump or a pressurized accumulator.

Further, in some embodiments, the secondary braking unit includes a bleed-off valve configured to selectively bleed off fluid from the pump to the second reservoir.

Further, in some embodiments, the vehicle braking system includes a pump separation valve positioned between a discharge side of the pump and the wheel cylinder.

In yet another aspect, a vehicle braking system includes a master cylinder, a wheel cylinder, a first valve block and a second valve block. The first valve block defines a primary braking unit having a first pressure generating unit. The first valve block includes a primary outlet port and a first flow passage extending between the master cylinder and the first outlet port. The second valve block defines a secondary braking unit having a second pressure generating unit. The second valve block includes a secondary inlet port in communication with the primary outlet port of the first valve block, a secondary outlet port in direct communication with the wheel cylinder without intervening valving, and a second flow passage extending between the second inlet port and the second outlet port.

Further, in some embodiments, the vehicle braking system includes one or more ABS valves in the first flow passage operable to control traction control and anti-lock braking.

Further, in some embodiments, the vehicle braking system includes one or more ABS valves in the second flow passage operable to control traction control and anti-lock braking.

Further, in some embodiments, the second valve block is physically mounted to the first valve block.

Further, in some embodiments, the first valve block communicates with the wheel cylinder solely through the second valve block.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
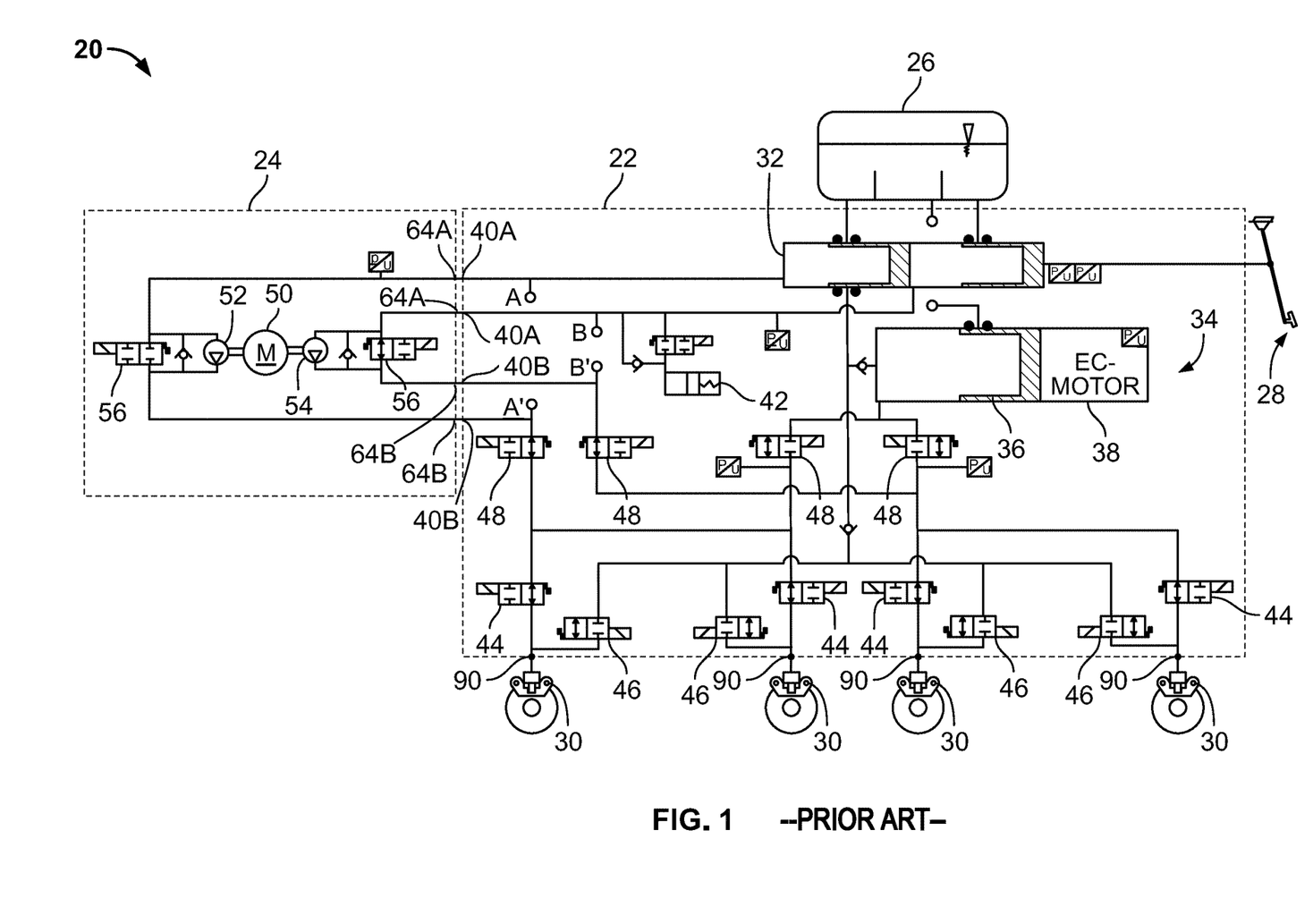
FIG. 1 is a schematic view of a vehicle braking system including a primary braking unit and a secondary braking unit according to the prior art.

FIG. 1 illustrates a vehicle braking system 20. The braking system 20 includes a primary braking unit 22 and a secondary braking unit 24, a fluid reservoir 26, an input device 28 such as a brake pedal, and a plurality of wheel cylinders 30 (as shown, the vehicle braking system includes four wheel cylinders 30) connected to the primary braking unit 22 at a plurality of outlet ports 90. In some embodiments, the primary braking unit 22 and the secondary braking unit 24 define first and second valve blocks. The primary braking unit 22 includes a master cylinder 32 and an electronically controlled pressure generating unit 34 operable to increase the fluid output from the primary braking unit 22 to the wheel cylinders 30. Though the master cylinder 32 is shown as being within the primary braking unit 22, the master cylinder 32 may otherwise be a separate component connected (e.g., directly) to the primary braking unit 22. As shown, the electronically controlled pressure generating unit 34 is a plunger 36 driven by an electric motor 38 to displace fluid throughout the braking unit 22. The master cylinder 32 and electronically controlled pressure generating unit 34 are two fluid suppliers. The vehicle braking system 20 includes a third fluid supplier, motor-driven pumps, which will be explained in greater detail below.

The primary braking unit 22 further includes a pedal feel simulator 42. The simulator 42 is in selective communication with the master cylinder 32 to relay feedback to the input device 28 proportional to the force supplied by the user to the input device 28.

The primary braking unit 22 further includes a plurality of valves, specifically: inlet valves 44 and outlet valves 46. The braking unit 22 shown in FIG. 1 includes four inlet valves 44 and four outlet valves 46, one of each valve 44, 46 associated with each of the wheel cylinders 30. The inlet valves 44 are located between the respective wheel cylinder 30 and the fluid suppliers. The outlet valves 46 are located between the wheel cylinder and atmospheric pressure at the reservoir 26. The inlet valves 44 are normally open control valves and the outlet valves 46 are normally closed control valves. The valves 44, 46 are ABS valves and are selectively manipulated (opened and closed to varying degrees via feedback from sensors, etc.) to control aspects of braking such as an anti-lock braking system (ABS), traction control, or an electronic stability program (ESP).

The secondary braking unit 24 includes a motor 50 operable to drive a plurality of pumps 52, 54. Each pump 52, 54 provides fluid to two of the wheel cylinders 30 (e.g., the first pump 52 provides fluid to the front wheel cylinders 30 and the second pump 54 provides fluid to the rear wheel cylinders). Alternatively, the first pump 52 may provide fluid to the front left wheel cylinder 30 and the rear right wheel cylinder 30 and the second pump 54 may provide fluid to the front right wheel cylinder 30 and the rear left wheel cylinder. Fluid for the pumps 52, 54 is drawn from the reservoir 26.

The secondary braking unit 24 further includes switch-over valves 56. The switch-over valves 56 are biased open but are closeable to block fluid path from the master cylinder 32 to the wheel cylinders 30.

The secondary braking unit 24 is connected (e.g., directly) to the primary braking unit 22 at a plurality of ports 40A, 40B of the primary braking unit 22. Specifically, the primary braking unit 22 includes outlet ports 40A that interface with inlet ports 64A of the secondary braking unit 24 to connect the master cylinder 32 and the reservoir 26 to the inlet side of the pumps 52, 54. Further, the secondary braking unit 24 includes outlet ports 64B that interface with outlet ports 40B of the primary braking unit 22 to connect the outlet side of the pumps 52, 54 with the wheel cylinders 30. Therefore, the fluid path from the master cylinder 32 to the wheel cylinders 30 passes through the primary braking unit 22, the outlet port 40A, and the inlet port 64A, into the secondary braking unit 24, through the outlet port 64B and the inlet port 40B, and into primary braking unit 22. Once in the primary braking unit 22 for the second time, the fluid path extends through the inlet valve 44 to the wheel cylinder 30.

The braking system 20 is operable in three modes: a normal, driver-initiated input mode, a back-up, driver initiated input mode, and a non-driver-initiated mode. In the normal input mode, a brake-by-wire mode, a user actuates the input device 28, thereby displacing fluid from the master cylinder 32. Via signals from a sensor (e.g., pressure sensor, pedal travel sensor, volumetric rate sensor, etc.), the motor 38 of the electronically controlled pressure generating unit 34 is actuated to drive the plunger 36, thereby displacing fluid volume and providing braking at the wheel cylinders 30. If anti-lock braking, traction control, or stability control are needed, the inlet and outlet valves 44, 46 are manipulated via a controller (not shown) to provide the requested control. The switch-over valves 56 (and/or additional valves 48 located between the master cylinder 32 and the inlet valves 44) are closed, thereby prohibiting fluid from the master cylinder 32 from directly influencing the wheel cylinders 30. The pedal feel simulator 42 is in communication with the master cylinder 32 to provide feedback to the input device 28 and to the operator.

The back-up input mode is utilized when the operator provides an input to the input device 28 and the electronically controlled pressure generating unit 34 is incapable of providing a corresponding volume of fluid to the wheel cylinders 30. Such a scenario may occur, for example, if a sensor provides a signal outside of a predetermined range, or if the motor 38 is incapable of activating the plunger 36. In the back-up input mode, the valves 48 and the switch-over valves 56 are open to permit fluid from the master cylinder 32 to apply a braking force at the wheel cylinders 30.

The non-driver-initiated mode is utilized when the operator does not provide an input to the input device 28, but vehicle sensors determine that a braking action is required. For example, the non-driver-initiated mode is utilized to prevent a collision as part of an automatic braking system. In the non-driver-initiated mode, without input from the input device 28, the motor 50 is actuated to activate the pumps 52, 54, thereby drawing fluid from the reservoir 26. The switch-over valves 56 are closed such that the fluid path from the reservoir 26 passes through the pumps 52, 54. The fluid from the pumps 52, 54 is provided to the wheel cylinders 30, completing the braking action. If anti-lock braking, traction control, or stability control are needed, the inlet and outlet valves 44, 46 are manipulated via the controller (not shown) to provide the requested control.

Figure 2:
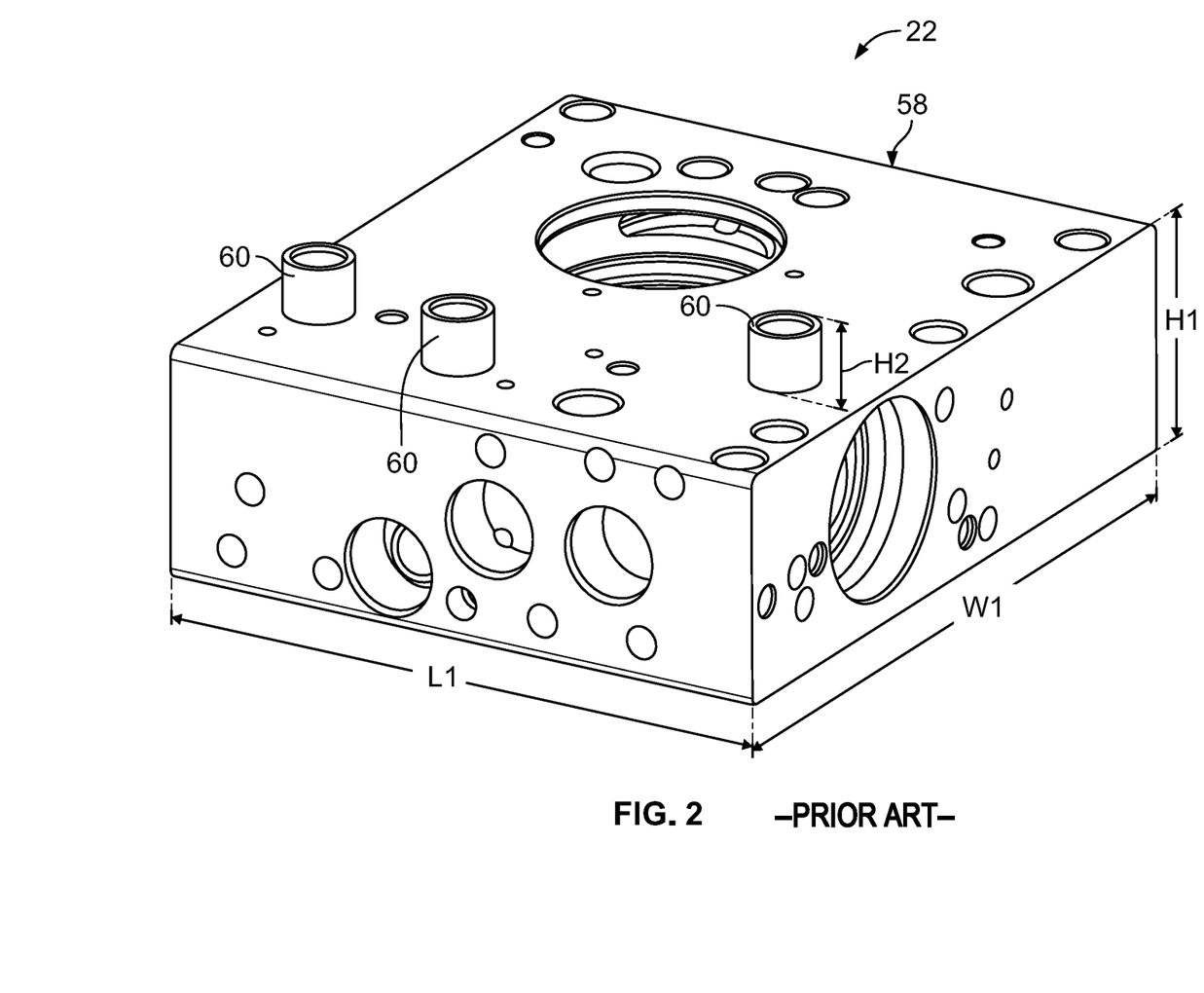
FIG. 2 is a perspective view of a housing of the primary braking unit of the vehicle braking system of FIG. 1.

As shown in FIG. 2, the primary braking unit 22 is at least partially defined by a housing or valve block 58. The valve block 58 has a length L1, a width W1, and a height H1. In order to accommodate components of the secondary braking unit 24, the valve block 58 is outfitted with port towers 60. The port towers (as shown, three port towers) 60 extend a height H2, above the height H1 of the valve block 58, thereby increasing the overall height of the block 58. In order to reduce the overall height of the valve block 58 and to increase the responsiveness of the secondary braking unit 24, the brake circuit 20 is modified as shown in the brake circuits 120, 220, and 320 of FIGS. 3, 4, and 5, respectively. In the brake circuits 120, 220, 320, the ports 40A, 40B are obviated and may be removed or blocked off.

Figure 3:
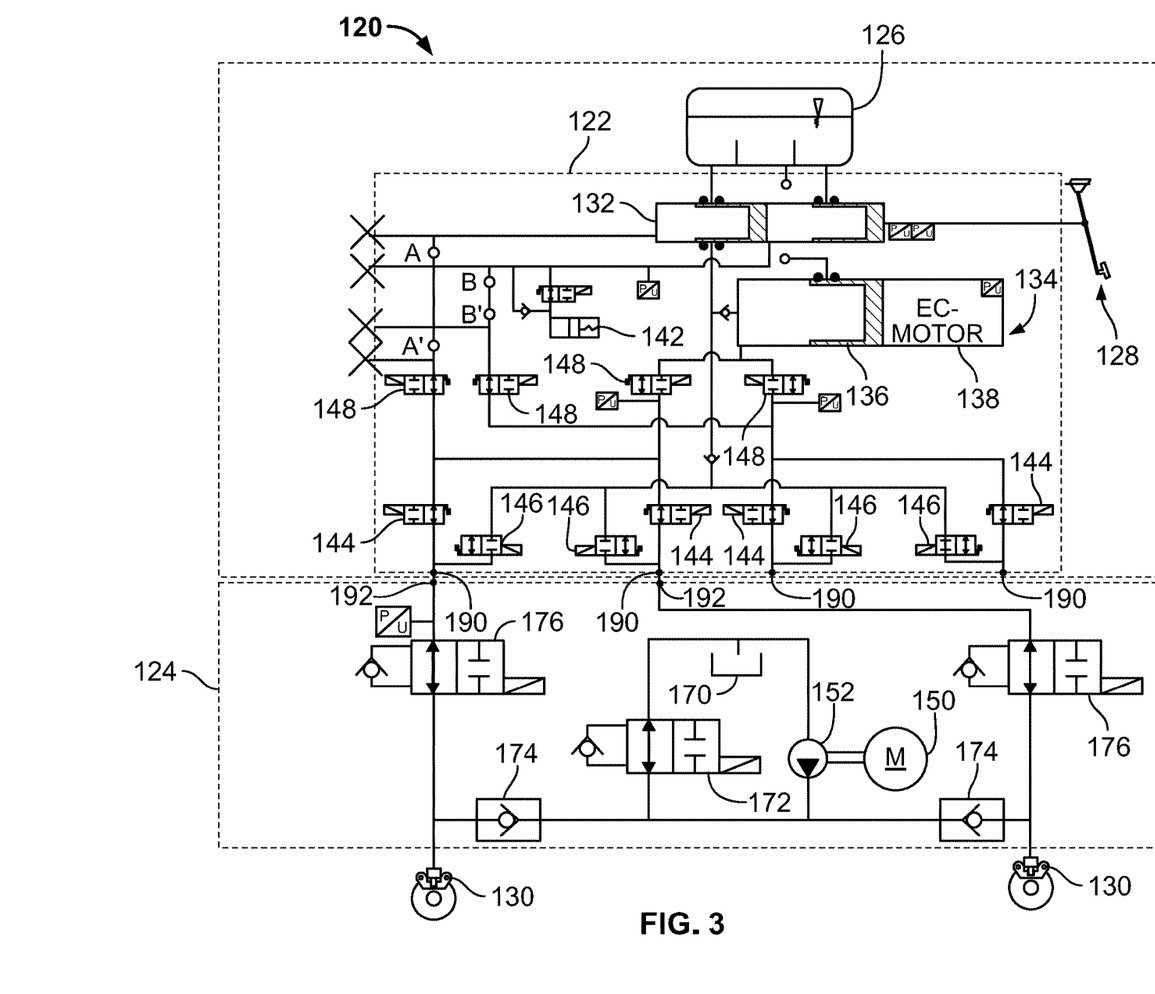
FIG. 3 is a schematic view of a braking system according to one embodiment of the present invention.

FIG. 3 illustrates an embodiment of a braking system 120. The illustrated braking system 120 is similar to the braking system 20 discussed above, except as otherwise described. Like elements are numbered with like reference numerals, incremented by 100.

The secondary braking unit 124 is located between the primary braking unit 122 and the wheel cylinders 130. More specifically, the secondary braking unit 124 is located between the wheel cylinders 130 and both fluid suppliers of the primary braking unit 122 (i.e., downstream of both the master cylinder 132 and the electronically controlled pressure generating unit 134). Further still, the secondary braking unit 124 is located between the inlet valves 144 and the wheel cylinders 130. Further still, the primary braking unit 122 includes outlet ports 190 at an outer surface of the primary braking unit 122 (i.e., at an outer surface of a valve block defining the primary braking unit 122). Each outlet port 190 is associated with one of the wheel cylinders 130 and, if not for the secondary braking unit 124, each outlet port would be connected directly to the respective wheel cylinder (i.e., with no intervening valving). Inlet ports 192 of the secondary braking unit 124 are connected (e.g., directly) to the outlet ports 190. Physically, the secondary braking unit 124 is defined by a valve block that is mounted directly to a valve block defining the first braking unit 122. Similar to the master cylinder 32 described above with respect to FIG. 1, the master cylinder 132 may be part valve block defined by the primary braking unit 122 or may be a separate component connected (e.g., directly) to the primary braking unit 122.

Written another way, a first flow passage is defined between the master cylinder 132 and the outlet port 190, a second flow passage is defined between the inlet port 192 and the wheel cylinder 130 (or the outlet port of the secondary braking unit 124), and the second flow passage is the sole passage from the master cylinder 132 to the wheel cylinder 130. A third flow passage may be defined between the electronically controlled pressure generating unit 134 and the outlet port 190, and the second flow passage is the sole passage from the electronically controlled pressure generating unit 134 to the wheel cylinder 130. The secondary braking unit 124 is connected in series or in-line between the primary braking unit 122 and the wheel cylinders 130. The first and second braking units 122, 124 form a combined braking system in which the outlets to the wheel cylinders 130 are provided with pressurized fluid only through the secondary braking unit 124.

For clarity, only one half of the secondary braking unit 124 is shown, with the other half of the secondary braking unit 124 mirroring the first half (though the two halves may share a motor 150, similar to the shared motor 50 in FIG. 1) and located between the remaining inlet valves 144 and wheel cylinders 130.

The illustrated half of the secondary braking unit 124 includes a pump 152 driven by the motor 150 and located downstream of a reservoir 170, a bleed-off valve 172, a one-way valve 174 associated with each wheel cylinder 130, and a separation valve 176 associated with each wheel cylinder 130. The reservoir 170, as shown, is distinct from the reservoir 126, which offers advantages as described below. Alternatively, the reservoir 170 may be in communication with the reservoir 126.

The bleed-off valve 172 is located downstream of a discharge side of the pump 152, between the pump 152 and the reservoir 170. The bleed-off valve 172 is a pressure control valve operable to selectively open and bleed off some of the fluid from the pump 152. The bleed-off valve 172 is normally biased towards the open position but is closed or partially closed when the pump 152 is operated.

Each one-way valve 174 is located between the discharge side of the pump 152 and the respective wheel cylinder 130. Once the fluid from the pump overcomes a preset force in the one-way valve 174 (e.g., a negligible amount relative to the force required to timely brake the vehicle), the one-way valve 174 permits fluid flow from the pump 152 to the respective wheel cylinder 130. The one-way valve 174 further prevents fluid from the primary braking unit 122 from venting to atmospheric pressure at the reservoir 170.

Each separation valve 176 is operable to permit or prohibit fluid flow from the primary braking unit 122 from reaching and actuating the respective wheel cylinder 130. The separation valves 176 are biased to the open position, thereby allowing fluid provided by actuation of the master cylinder 132 or electronically controlled pressure generating unit 134 to reach the respective wheel cylinders 130 in the normal input mode and the back-up input mode. However, when the pump 152 is actuated (e.g., in the non-driver-initiated mode), the separation valves 176 are closed to prohibit leakage of the fluid from the secondary braking unit 124 into the primary braking unit 122.

The braking system 120 is operable in the normal input mode, the back-up input mode, and the non-driver-initiated mode. In the normal input mode, the user actuates the input device 128, thereby displacing fluid from the master cylinder 132. Via signals from a sensor (e.g., pressure sensor, pedal travel sensor, volumetric rate sensor, etc.), the motor 138 of the electronically controlled pressure generating unit 134 is actuated to drive the plunger 136, thereby displacing fluid volume. The separation valves 176 are open, thereby allowing the fluid provided by the actuated electronically controlled pressure generating unit to pass from the primary braking unit 122, through the secondary braking unit 124, and providing braking at the wheel cylinders 130. If anti-lock braking, traction control, or stability control are needed, the inlet and outlet valves 144, 146 are manipulated via a controller (not shown) to provide the requested control. The valves 148 are closed, thereby prohibiting fluid from the master cylinder 132 from directly influencing the wheel cylinders 130. The pedal feel simulator 142 is in communication with the master cylinder 132 to provide feedback to the input device 128 and to the operator.

The back-up input mode is utilized when the operator provides an input to the input device 128 and the electronically controlled pressure generating unit 134 is incapable of providing a corresponding volume of fluid to the wheel cylinders 130. Such a scenario may occur, for example, if a sensor provides a signal outside of a predetermined range, or if the motor 138 is incapable of activating the plunger 136. In the back-up input mode, the valves 148 and the separation valves 176 are open to permit fluid from the master cylinder 132 to apply a braking force at the wheel cylinders 130.

Alternatively, the braking system 120 may be operable in a modified back-up input mode. The modified back-up input mode is utilized when the operator provides an input to the input device 128 and the electronically controlled pressure generating unit 134 is incapable of providing a corresponding volume of fluid to the wheel cylinders 130. In the back-up input mode, the motor 150 is actuated to activate the pump 152, thereby drawing fluid from the reservoir 170, past the one-way valves 174, and to the wheel cylinders 130. Therefore, in the modified back-up input mode, the secondary braking unit 122 provides the braking force at the wheel cylinders 130. The modified back-up input mode may be utilized if the controller (not shown) verifies the functionality of the secondary braking unit 122.

The non-driver-initiated mode is utilized when the operator does not provide an input to the input device 128, but vehicle sensors determine that a braking action is required. For example, the non-driver-initiated mode is utilized to prevent a collision as part of an automatic braking system (e.g., via collision detection or in a highly automated vehicle). In the non-driver-initiated mode, without input from the input device 128, the motor 150 is actuated to activate the pump 152 (and the pump associated with the other two wheel cylinders 130; not shown) thereby drawing fluid from the reservoir 170, past the one-way valves 174, and to the wheel cylinders 130. The bleed-off valve 172 may bleed off some of the fluid back to the tank to control the amount of fluid pressure applied to the wheel cylinders 130. The separation valves 176 are closed to prevent the fluid used to actuate the wheel cylinders 130 from leaking into the primary braking unit 122. Once the braking action is complete and the user desires vehicle movement once again (e.g., depresses and releases the input member 128, depresses an acceleration pedal, etc.), the fluid returns through the master cylinder 132 to the reservoir 126. Without a return path for fluid within the secondary braking unit 124, the secondary braking unit 124 has a limited number of actuations dependent upon the amount of fluid in the reservoir 170. This can be remedied by selectively refilling the reservoir 170 with the main reservoir 126, or by providing a return line as shown in FIG. 4.

Alternatively, the braking system 120 may be operable in a modified non-driver-initiated mode. The modified non-driver-initiated mode is utilized when the operator does not provide an input to the input device 128, but vehicle sensors determine that a braking action is required, for example, in response to a signal from a collision detection system or in normal operation of a highly automated vehicle. In the modified non-driver initiated mode, without input from the input device, the controller (not shown) provides braking to the wheel cylinders 130 via either the electronically controlled pressure generating unit 134 of the primary braking unit 122 or the motor-driven pump 152 of the secondary braking unit 124, depending upon the urgency of the braking request or the functionality of the braking units 122, 124. The controller may default to, for example, the primary braking unit 122 and only utilize the secondary braking unit 124 in the modified non-driver initiated mode if the primary braking unit 122 is incapable of providing the requested volume of fluid to the wheel cylinders 130.

Figure 4:
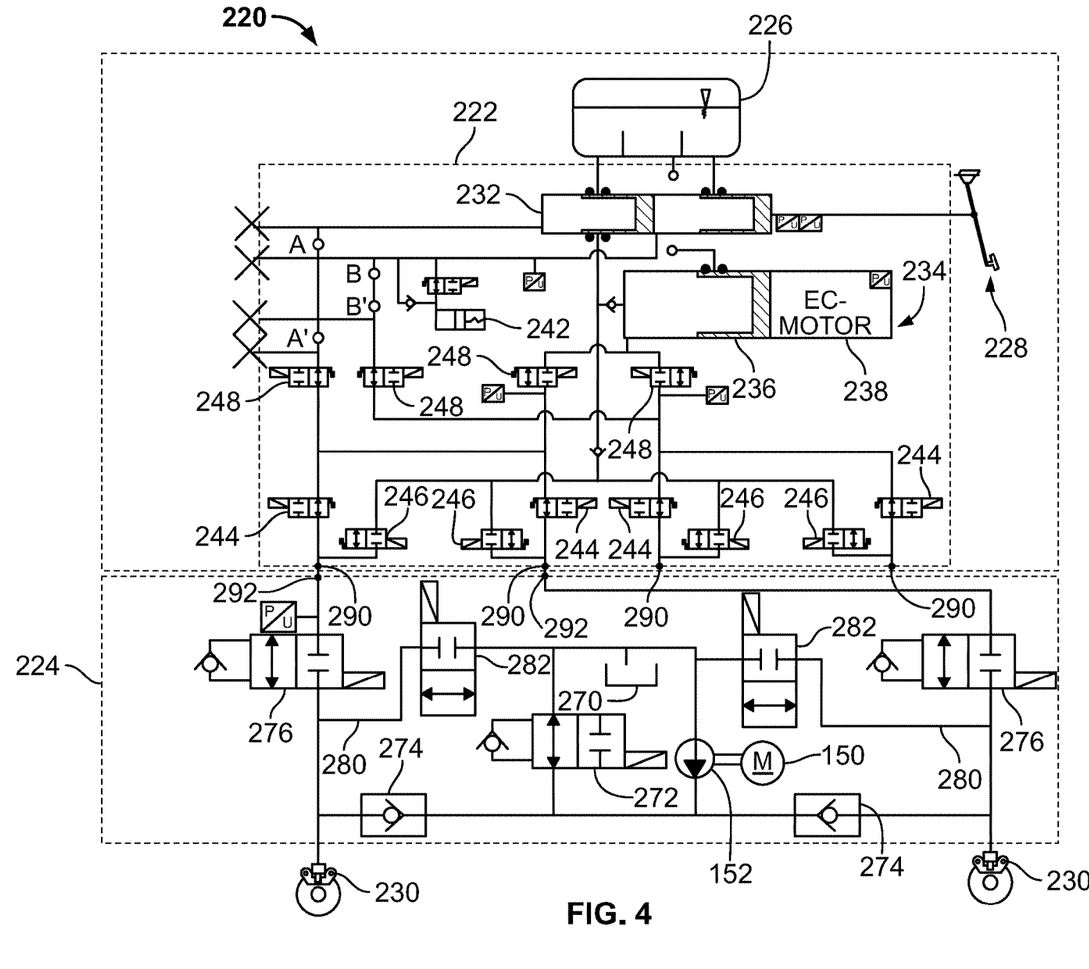
FIG. 4 is a schematic view of a braking system according to another embodiment of the present invention.

FIG. 4 illustrates another embodiment of a braking system 220. The illustrated braking system 220 is similar to the braking systems 20, 120 discussed above, except as otherwise described. Like elements are numbered with like reference numerals, incremented from FIG. 1 by 200.

The secondary braking unit 224 further includes a return line 280 associated with each wheel cylinder 230. An outlet switch valve 282 is located in each return line 280. When the outlet switch valve 282 is in an open position, fluid from the respective wheel cylinder 230 passes through the return line 280 and to the reservoir 270. When the outlet switch valve 282 is in a closed position, fluid from the respective wheel cylinder 230 is unable to return to the reservoir 270.

The normal input mode, back-up input mode, and the non-driver-initiated mode of the braking system 220 illustrated in FIG. 4 are similar to the modes described with respect to FIG. 3. However, in the non-driver-initiated mode, when the braking action is complete and the user desires vehicle movement once again (e.g., depresses and releases the input member 228, depresses an acceleration pedal, etc.), the outlet switch valves 282 open and fluid from the wheel cylinders 230 is vented through the return lines 280 to the reservoir 270.

Despite their capabilities, the secondary braking units 124, 224 of the braking systems 120, 220 shown in FIGS. 3-4 are incapable of providing anti-lock braking, traction control, or stability control at the wheel cylinders 130, 230 in the non-driver-initiated mode because the secondary braking units 124, 224, are located downstream of the valves 144, 146, 244, 246 in the primary braking units 122, 222 that are modulated to provide anti-lock braking, traction control, and/or stability control.

Figure 5:
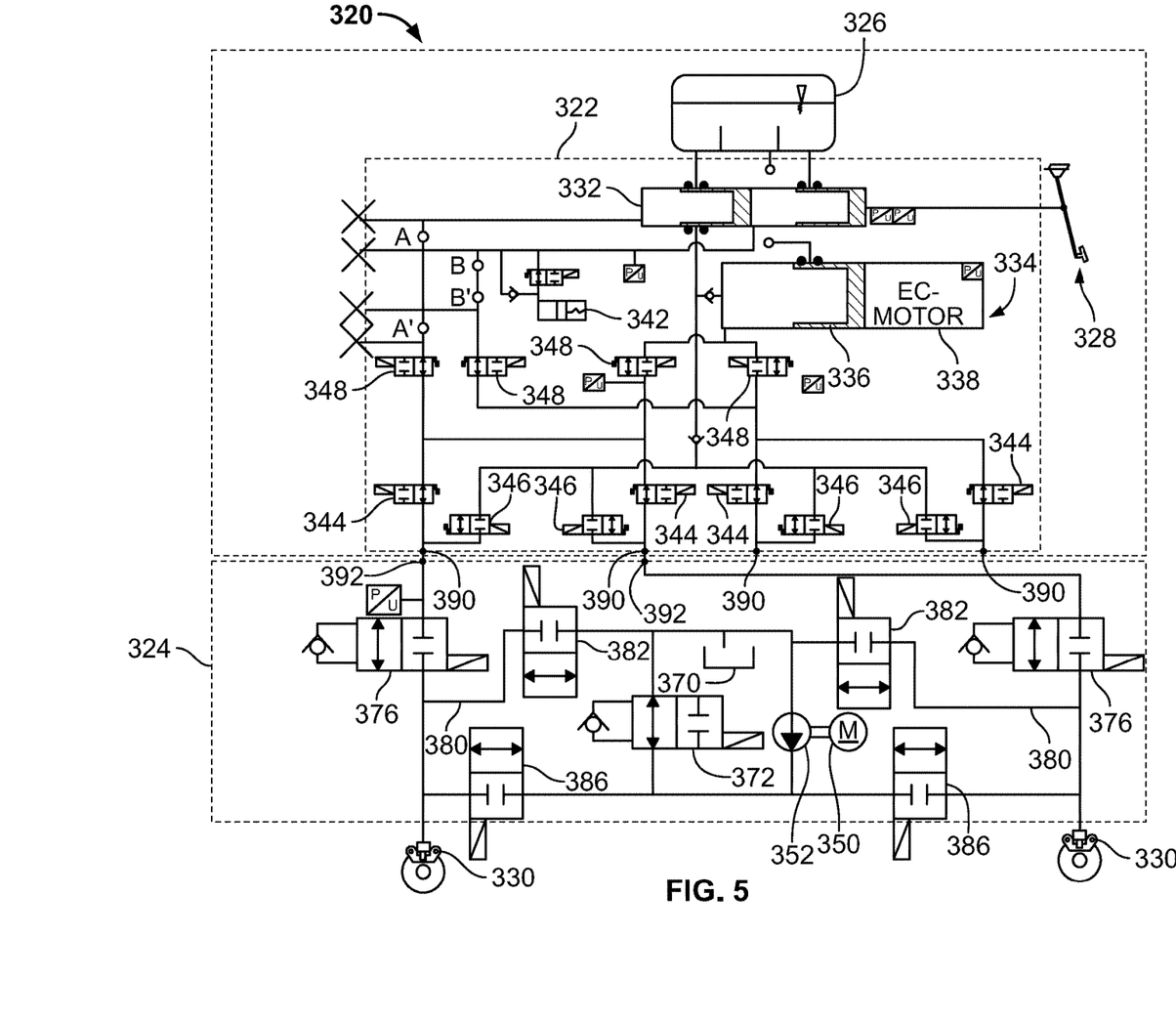
FIG. 5 is a schematic view of a braking system according to yet another embodiment of the present invention.

FIG. 5 illustrates another embodiment of a braking system 320. The illustrated braking system 320 is similar to the braking systems 20, 120, 220 discussed above, except as otherwise described. Like elements are numbered with like reference numerals, incremented from FIG. 1 by 300.

The secondary braking unit 324 shown in FIG. 5 replaces the one-way valves 274 of FIG. 4 with pump separation valves 386 such that a pump separation valve 386 is located between the discharge side of the pump 352 and each wheel cylinder 330. Each pump separation valve 386 is operable to transition between a closed position and a fully open position and can hold a plurality of open positions therebetween. The pump separation valve 386 and the outlet switch valve 382 function as ABS valves (inlet and outlet valves, respectively) to control aspects of braking such as an anti-lock braking system (ABS), traction control, or an electronic stability program (ESP).

The normal input mode and the back-up input mode of the braking system 320 illustrated in FIG. 5 are similar to the modes described with respect to FIG. 3. However, the non-driver-initiated mode is modified to account for the change in components. In the non-driver-initiated mode, without input from the input device 328, the motor 350 is actuated to activate the pump 352 (and the pump associated with the other two wheel cylinders 330; not shown) thereby drawing fluid from the reservoir 370. The pump separation valves 386 are opened to an open position to permit fluid flow past the pump separation valves 386, and to the wheel cylinders 330. The bleed-off valve 372 may bleed off some of the fluid back to the tank. Therefore, the pump separation valve 386 and the bleed-off valve 372 control the amount of fluid pressure applied to the wheel cylinders 330. The separation valves 376 are closed to prevent the fluid used to actuate the wheel cylinders 330 from leaking into the primary braking unit 322. Once the braking action is complete and the user desires vehicle movement once again (e.g., depresses and releases the input member 328, depresses an acceleration pedal, etc.), the outlet switch valves 382 open and fluid from the wheel cylinders 330 is vented through the return lines 380 to the reservoir 370. If the braking system 320 is actuated in the non-driver-initiated mode in a scenario where anti-lock braking, traction control, and/or stability control are required (e.g., snowy or slushy conditions, hydroplaning, etc.), the ABS valves 382, 386 can be selectively manipulated (opened and closed to varying degrees via feedback from sensors, etc.) to control the traction of each wheel of the vehicle.

Figure 6:
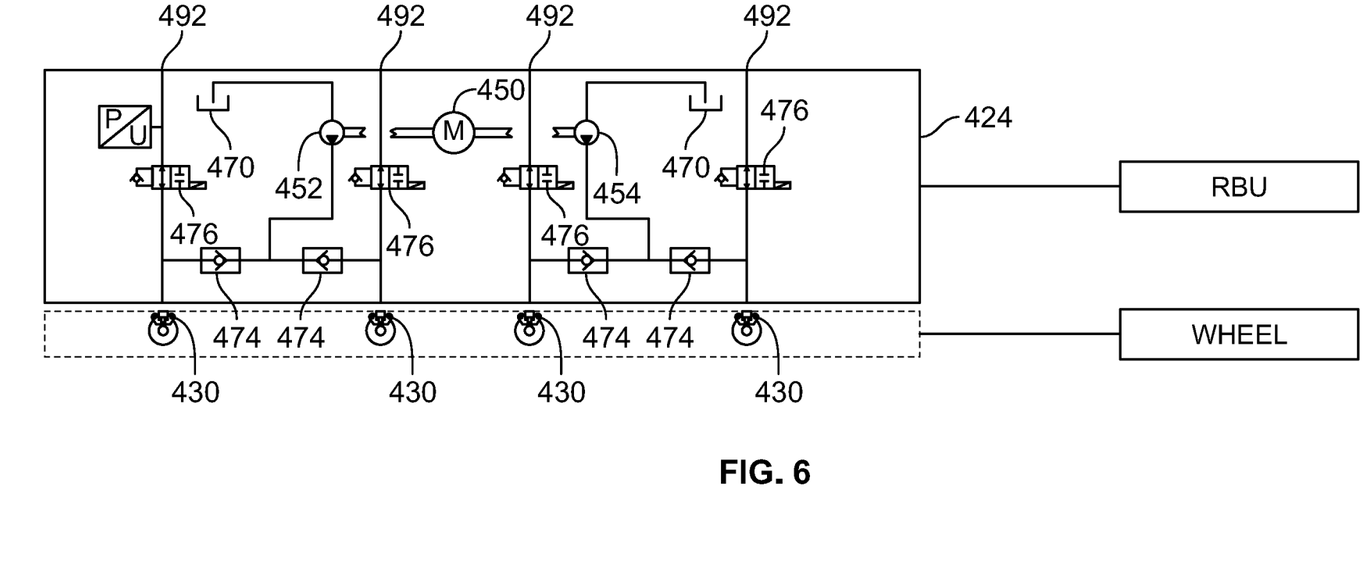
FIG. 6 is a schematic view of a secondary braking system according to an embodiment of the present invention.

FIG. 6 illustrates another embodiment of a secondary braking unit 424. The illustrated secondary braking unit 424 is similar to the secondary braking units 124, 224, 324 discussed above, except as otherwise described. Like elements are numbered with like reference numerals, incremented from FIG. 1 by 400.

FIG. 6 only illustrates the secondary braking unit 424, though a primary braking unit (such as the primary braking unit 122, 222, 322) is connected to the secondary braking unit 424 at the port locations 492. In contrast to FIGS. 3-5, FIG. 6 illustrates both halves of the secondary braking unit 424. The secondary braking unit 424 differs from the secondary braking unit 124 of FIG. 3 by removing the bleed-off valve 172 and the line through the bleed-off valve 172 that connects the downstream side of the pump 152 to the reservoir 170. When the secondary braking unit 424 is actuated, the corresponding pressure generated by the pump 452, 454 cannot be bled-off to the reservoir 470. Therefore, the secondary braking unit 424 provides a braking pressure consistent with the output of the pump 452, 454. Alternatively, when the pumps 452, 454 are actuated, the separation valves 476 may be used to bleed off fluid pressure to the primary braking unit via ports 492. Upon completion of the braking action, the separation valves 476 return fluid to the master cylinder reservoir (not shown).

Figure 7:
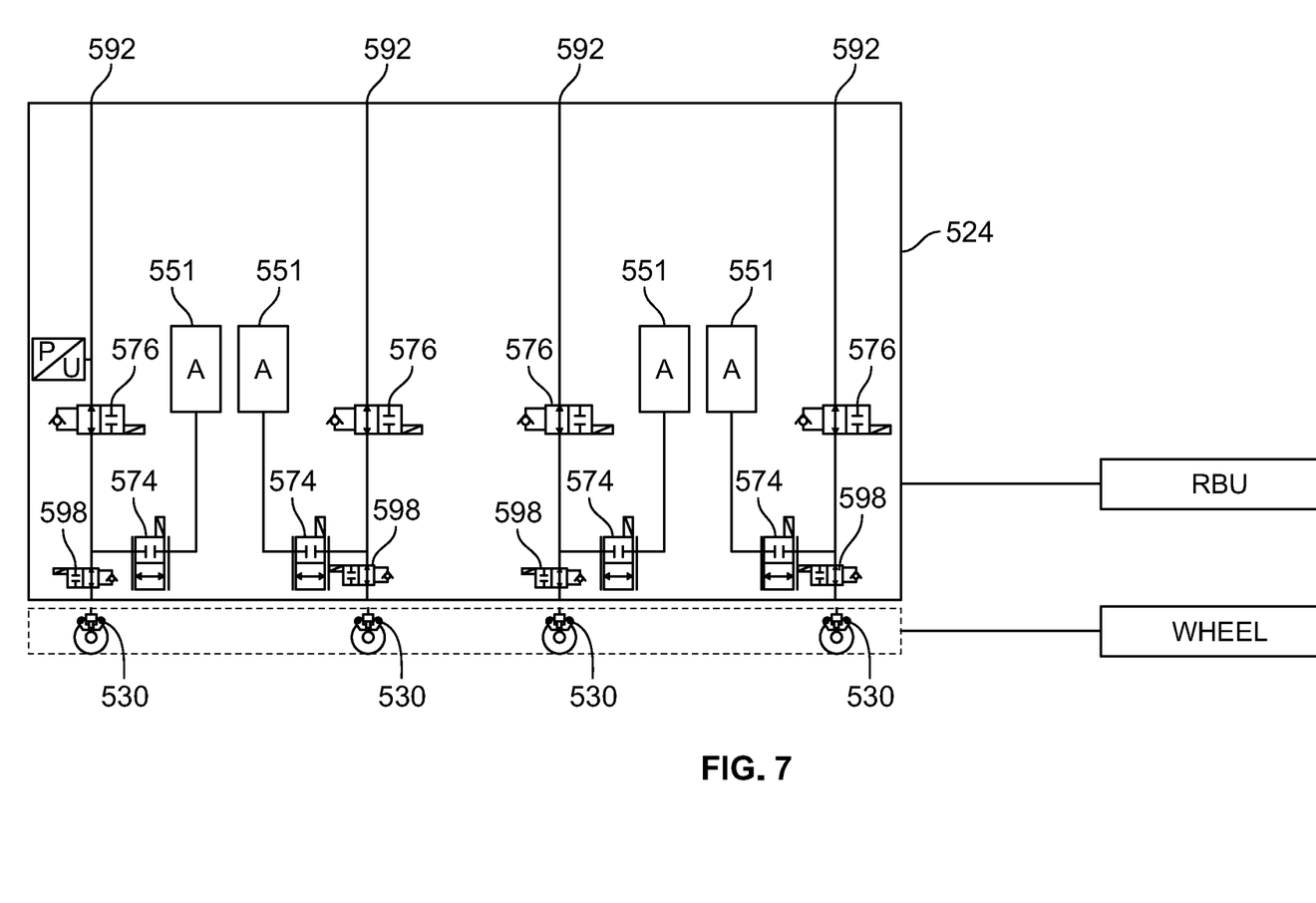
FIG. 7 is a schematic view of a secondary braking system according to another embodiment of the present invention.

FIG. 7 illustrates another embodiment of a secondary braking unit 524. The illustrated secondary braking unit 524 is similar to the secondary braking units 124, 224, 324, 424 discussed above, except as otherwise described. Like elements are numbered with like reference numerals, incremented from FIG. 1 by 500.

FIG. 7 only illustrates the secondary braking unit 524, though a primary braking unit (such as the primary braking unit 122, 222, 322) is connected to the secondary braking unit 524 at the port locations 592. The secondary braking unit 524 differs from the secondary braking unit 124 of FIG. 3 by replacing the motor 150, pump 152, bleed-off valve 172, and reservoir 170 with accumulators 551 and control valves 574 (similar to control valves 386 of FIG. 5). When the secondary braking unit 524 is actuated, the control valves 574 open and the separation valves 576 close. Then, the accumulators 551 provide stored fluid pressure to the wheel cylinders 530 through the control valves 574. The control valves 574 may adjust the flow rate or pressure from the accumulators 551. Upon completion of the braking action, the separation valves 576 open to return fluid to the master cylinder reservoir (not shown).

An additional valve 598 (e.g., control valve, two-position valve) is provided upstream of each wheel cylinder 530, but downstream of the junction connecting each accumulator 551 to the respective port 592. In order to recharge an accumulator, the separation valve 576 and the control valve 574 are opened to provide an open fluid path between the port 592 (and the primary braking unit) and the accumulator 551. The valve 598 is closed to prevent fluid from the port from providing a braking force at the wheel cylinder 530. An electronically-controlled pressure generating unit (similar to the unit 34; FIG. 1) is actuated to provide fluid through the port 592, the separation valve 576, and the control valve 574 to recharge the accumulator 551. Once the accumulator 551 is recharged, the electronically-controlled pressure generating unit is stopped, the control valve 574 closes, and the valve 598 reopens. If, during the recharge process, a brake input is detected, the recharge process is canceled and the valve 598 is opened.

Figure 8:
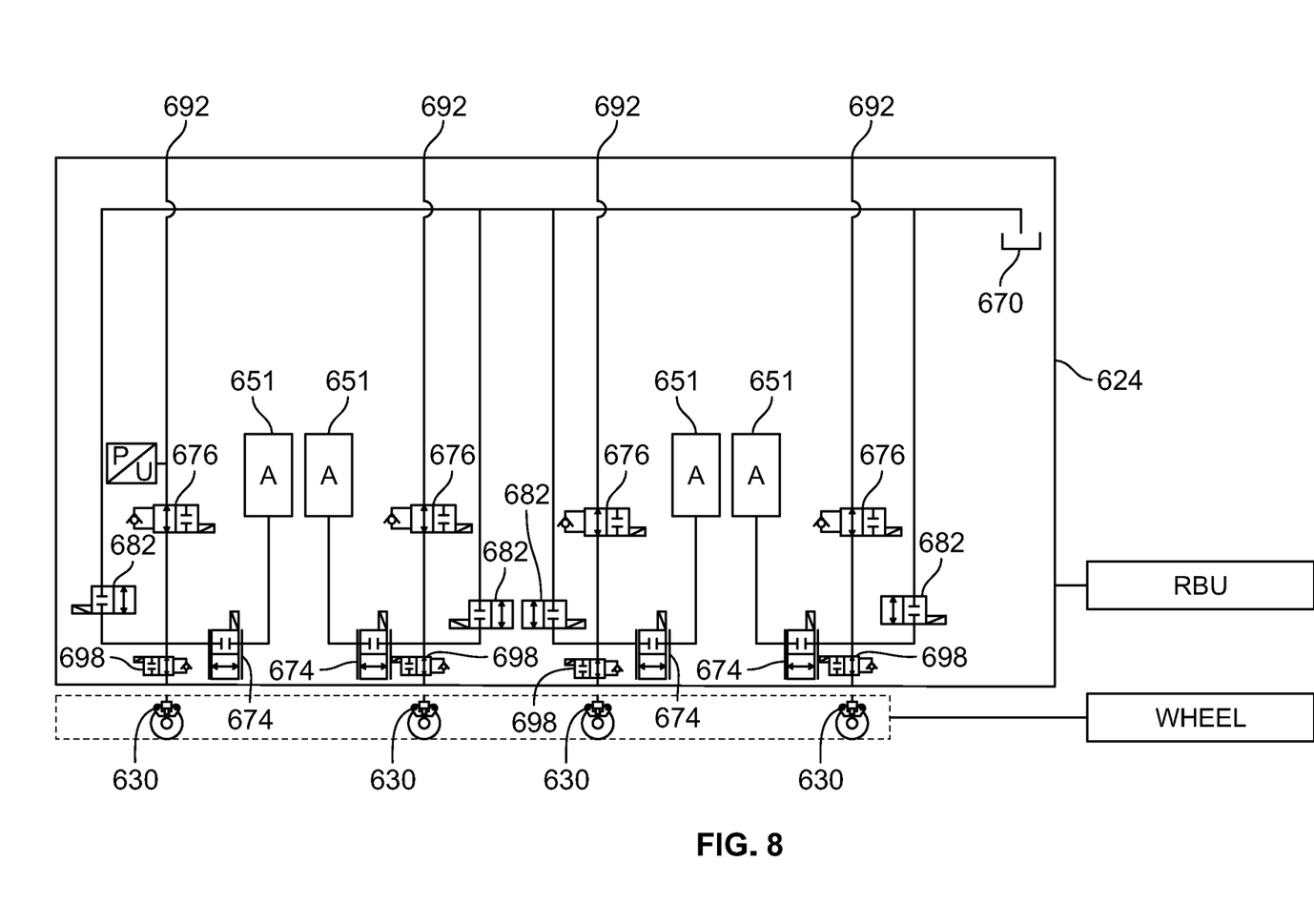
FIG. 8 is a schematic view of a secondary braking system according to yet another embodiment of the present invention.

FIG. 8 illustrates another embodiment of a secondary braking unit 624. The illustrated secondary braking unit 624 is similar to the secondary braking units 124, 224, 324, 424, 524 discussed above, except as otherwise described. Like elements are numbered with like reference numerals, incremented from FIG. 1 by 600.

FIG. 8 only illustrates the secondary braking unit 624, though a primary braking unit (such as the primary braking unit 122, 222, 322) is connected to the secondary braking unit 624 at the port locations 692. The secondary braking unit 624 differs from the secondary braking unit 524 of FIG. 7 by introducing outlet switch valves 682, a return line 680, and a reservoir 670. The outlet switch valves 682 are similar to the outlet switch valves 282, 382 shown in FIGS. 4-5. When the secondary braking unit 624 is actuated, the control valves 674 open and the separation valves 676 close. Then, the accumulators 651 provide stored fluid pressure to the wheel cylinders 530 through the control valves 674. The outlet switch valves 682 are selectively manipulated (opened and closed via feedback from sensors, etc.) to control aspects of braking such as an anti-lock braking system (ABS), traction control, or an electronic stability program (ESP). Fluid through the outlet switch valves 682 passes through the return line 680 to the reservoir 670. Upon completion of the braking action, the separation valves 576 open to return fluid to the master cylinder reservoir (not shown). Alternatively, the outlet switch valves 682 may open to return fluid to the reservoir 670. The recharge process of the secondary braking unit 624 is similar to the process described with respect to the secondary braking unit 524 of FIG. 7.

The braking systems 120, 220, 320 shown in FIGS. 3-5 and the secondary braking units 424, 524, 624 shown in FIGS. 6-8 offer a number of advantages over the braking system 20 shown in FIGS. 1-2. Due to the physical location of the secondary braking units 124, 224, 324 relative to the wheel cylinders 130, 230, 330 (i.e., located directly upstream of the wheel cylinders 130, 230, 330), the connection between the pump 152, 252, 352, 452, 454 or the accumulator 551, 651 and the wheel cylinders 130, 230, 330 is shorter than the connection between the pumps 52, 54 and the wheel cylinders 30 of FIG. 1. Because of the shorter distance, the fluid volume has to move a shorter distance, thereby decreasing the time required to actuate a braking action at the wheel cylinders 130, 230, 330, 430, 530, 630.

Further, with reference to FIG. 5, because a control valve 386 is provided between each wheel cylinder 130 and the discharge side of the pump 352, the braking provided at each wheel cylinder 330 in the non-driver-initiated mode is separately controllable.

Further still, the primary braking unit 122, 222, 322 does not require port towers physically extending from the valve block. The primary braking unit 122, 222, 322 does not require separate ports at all for the secondary braking unit 124, 224, 324, 424, 524, 624 as the inlet ports 192, 292, 392, 492, 592, 692 of the secondary braking unit 124, 224, 324, 424, 524, 624 aligns with the standard ports 190, 290, 390 for the wheel cylinders 130, 230, 330, 430, 530, 630. Therefore, the braking system 120, 220, 320 is modular as the primary braking unit 122, 222, 322 is usable with or without attaching the secondary braking unit 124, 224, 324, 424, 524, 624. In other words, the outlet ports 190, 290, 390 of the primary braking unit 122, 222, 322 can be connected directly to the wheel cylinders 130, 230, 330, 430, 530, 630 or can be connected to the secondary braking unit 124, 224, 324, 424, 524, 624 via the inlet ports 192, 292, 392, 492, 592, 692. Then, the secondary braking unit 124, 224, 324, 424, 524, 624 is connected to the wheel cylinders 130, 230, 330, 430, 530, 630.

Further still, the braking system 20 relies on fluid from the master cylinder reservoir 26 in the non-driver-initiated mode, affecting pedal feel should the operator contact the input device 28 because the fluid path extends through the master cylinder 32. Utilizing a separate reservoir 170, 270, 370, 470 as shown in FIGS. 3-6 avoids interference with the master cylinder 132, 232, 332 so that any input by the operator in the non-driver-initiated mode does not sense the effects of braking provided by the pump 152, 252, 352, 452, 454. Additionally, as there are no valves or fluid suppliers between the reservoir 170, 270, 370, 470 and the pump 152, 252, 352, 452, 454 the pressure upstream of the suction side of the pump 152, 252, 352, 452, 454 will always be a low pressure (e.g., at or within 1, 5, 10, 15 PSI of atmospheric pressure, etc.), thereby increasing reliability of the pump 152, 252, 352, 452, 454.

What is claimed is:

1. A vehicle braking system comprising:
    a master cylinder;
    a wheel cylinder;
    a primary braking unit including a first pressure generating unit distinct from the master cylinder and operable to actuate a braking action at the wheel cylinder in a primary mode of operation, and an outlet port connecting the primary braking unit to the wheel cylinder; and
    a secondary braking unit including a second pressure generating unit distinct from the master cylinder and operable to actuate a braking action at the wheel cylinder in a secondary mode of operation,
    wherein the secondary braking unit has an inlet port connected to the outlet port of the primary braking unit;
    wherein the primary braking unit includes one or more ABS valves operable to control traction control and anti-lock braking in the primary mode of operation and located between the first pressure generating unit and the outlet port of the primary braking unit, wherein the secondary braking unit is located between the one or more ABS valves and the wheel cylinder, and
    wherein the secondary braking unit includes one or more ABS valves operable to control traction control and anti-lock braking in the secondary mode of operation and located between the second pressure generating unit and the wheel cylinder.

2. The vehicle braking system of claim 1, further comprising an input device, wherein the first pressure generating unit is operable in response to a user input to the input device in the first mode of operation, and wherein the second pressure generating unit is operable independent of the user input device in the second mode of operation.

3. The vehicle braking system of claim 1, wherein the wheel cylinder is one of a plurality of wheel cylinders, and the port is one of a plurality of ports connecting the primary braking unit to the plurality of wheel cylinders, wherein the secondary braking unit interfaces with the primary braking unit only at the plurality of ports.

4. The vehicle braking system of claim 1, wherein the first pressure generating unit is a motor-driven plunger, and wherein the second pressure generating unit is one of a motor-driven pump or an accumulator.

5. The vehicle braking system of claim 1, wherein the primary braking unit includes a first valve block and the secondary braking unit includes a second valve block mounted to the first valve block.

6. The vehicle braking system of any of claim 1, wherein the secondary braking unit further includes an inlet port at the outlet port of the primary braking unit and a separation valve positioned between the inlet port and the wheel cylinder, wherein the separation valve is in an open position in the primary mode of operation and is in a closed position in the secondary mode of operation.

7. The vehicle braking system of claim 1, wherein the secondary braking unit is operable without use of the primary braking unit.

8. A vehicle braking system comprising:
    a primary braking unit having a master cylinder operable to selectively provide pressurized fluid to an outlet port of the primary braking unit and a first pressure generating unit operable to selectively provide pressurized fluid to the outlet port of the primary braking unit;
    a secondary braking unit having an inlet port connected to the outlet port of the primary braking unit and a second pressure generating unit operable to selectively provide pressurized fluid to an outlet port of the secondary braking unit; and
    a controllable separation valve positioned between a discharge side of the second pressure generating unit and the wheel cylinder such that pressurized fluid from the discharge side of the second pressure generating unit is selectively connected to the wheel cylinder for braking on a path that extends through the controllable separation valve,
    wherein the primary braking unit and the secondary braking unit form a combined braking system having an outlet connecting the combined braking system to a wheel cylinder, and
    wherein the outlet of the combined braking system is provided in the secondary braking unit.

9. The vehicle braking system of claim 8, wherein the secondary braking unit is operable without use of the primary braking unit.

10. The vehicle braking system of claim 8, wherein the primary braking unit includes a first reservoir and the secondary braking unit includes a second reservoir.

11. The vehicle braking system of claim 10, wherein the second pressure generating unit is one of a motor-driven pump or a pressurized accumulator.

12. The vehicle braking system of claim 11, wherein the secondary braking unit includes a bleed-off valve configured to selectively bleed off fluid from the discharge side of the second pressure generating unit to the second reservoir.

13. A vehicle braking system comprising:
    a master cylinder;
    a wheel cylinder;
    a first valve block defining a primary braking unit having a first pressure generating unit, the first valve block including:
        a first outlet port;
        a first flow passage extending between the master cylinder and the first outlet port; and
        one or more ABS valves in the first flow passage operable to control traction control and anti-lock braking; and
    a second valve block defining a secondary braking unit having a second pressure generating unit, the second valve block including:

a secondary inlet port in communication with the first outlet port of the first valve block;

a second outlet port in direct communication with the wheel cylinder without intervening valving;

a second flow passage extending between the second inlet port and the second outlet port; and one or more ABS valves in the second flow passage operable to control traction control and anti-lock braking.

14. The vehicle braking system of claim 13, wherein the second valve block is physically mounted to the first valve block.

15. The vehicle braking system of claim 13, wherein the first valve block communicates with the wheel cylinder solely through the second valve block.

16. The vehicle braking system of claim 13, further comprising a third flow passage extending between the first pressure generating unit and the first outlet port, wherein the second flow passage extends between the wheel cylinder and both of the first flow passage and the third flow passage.

17. A vehicle braking system comprising:

a primary braking unit having a master cylinder operable to selectively provide pressurized fluid to an outlet port of the primary braking unit and a first pressure generating unit operable to selectively provide pressurized fluid to the outlet port of the primary braking unit; and a secondary braking unit having an inlet port connected to the outlet port of the primary braking unit and a second pressure generating unit operable to selectively provide pressurized fluid to an outlet port of the secondary braking unit;

wherein the primary braking unit and the secondary braking unit form a combined braking system having an outlet connecting the combined braking system to a wheel cylinder, wherein the outlet of the combined braking system is provided in the secondary braking unit, and wherein the primary braking unit includes a first reservoir and the secondary braking unit includes a second reservoir, wherein the second pressure generating unit is a motor-driven pump, and wherein the secondary braking unit includes a bleed-off valve configured to selectively bleed off fluid from the pump to the second reservoir.

18. A vehicle braking system comprising:

a master cylinder;

a wheel cylinder;

a primary braking unit including a first pressure generating unit distinct from the master cylinder and operable to actuate a braking action at the wheel cylinder in a primary mode of operation, and an outlet port connecting the primary braking unit to the wheel cylinder;

a secondary braking unit including a second pressure generating unit distinct from the master cylinder and operable to actuate a braking action at the wheel cylinder in a secondary mode of operation, and an input device, wherein the secondary braking unit has an inlet port connected to the outlet port of the primary braking unit;

wherein the primary braking unit includes one or more ABS valves operable to control traction control and anti-lock braking in the primary mode of operation and located between the first pressure generating unit and the outlet port of the primary braking unit, wherein the secondary braking unit is located between the one or more ABS valves and the wheel cylinder, and wherein the first pressure generating unit is operable in response to a user input to the input device in the first mode of operation, and wherein the second pressure generating unit is operable independent of the user input device in the second mode of operation.

* * * * *